(12) United States Patent
Choo

(10) Patent No.: US 7,561,193 B2
(45) Date of Patent: Jul. 14, 2009

(54) MOBILE COMMUNICATION TERMINAL WITH INTEGRATED PHOTOGRAPHIC APPARATUS AND METHOD FOR OPERATING THE SAME

(75) Inventor: Zhi-Min Choo, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 951 days.

(21) Appl. No.: 10/627,023

(22) Filed: Jul. 25, 2003

(65) Prior Publication Data
US 2004/0017500 A1 Jan. 29, 2004

(30) Foreign Application Priority Data
Jul. 26, 2002 (KR) ............... 10-2002-0044328

(51) Int. Cl.
H04N 5/262 (2006.01)
H04N 5/225 (2006.01)
H04M 1/00 (2006.01)
(52) U.S. Cl. ............ 348/240.3; 348/373; 455/575.1
(58) Field of Classification Search ... 348/240.1–240.3, 348/14.01, 333.06, 373–376; 455/575.1, 455/575.3
See application file for complete search history.

(56) References Cited

U.S. PATENT DOCUMENTS

| | | | |
|---|---|---|---|
| 4,847,647 A * | 7/1989 | Ueda | 396/62 |
| 5,491,507 A * | 2/1996 | Umezawa et al. | 348/14.02 |
| 5,615,398 A * | 3/1997 | Matsuyama | 396/77 |
| 6,115,197 A * | 9/2000 | Funahashi | 359/826 |
| 6,369,962 B1 * | 4/2002 | Nomura et al. | 359/822 |
| 6,469,841 B2 * | 10/2002 | Nomura et al. | 396/72 |
| 6,690,417 B1 * | 2/2004 | Yoshida et al. | 348/231.1 |
| 6,775,361 B1 * | 8/2004 | Arai et al. | 379/102.02 |
| 6,839,086 B1 * | 1/2005 | Katagiri | 348/240.3 |
| 6,909,464 B2 * | 6/2005 | Nomura et al. | 348/375 |
| 6,995,799 B2 * | 2/2006 | Itoh et al. | 348/333.06 |
| 7,084,919 B2 * | 8/2006 | Shibata et al. | 348/333.06 |

FOREIGN PATENT DOCUMENTS

KR 1020030091176 A 12/2003

* cited by examiner

*Primary Examiner*—Nhan T Tran
(74) *Attorney, Agent, or Firm*—Lee, Hong, Degerman, Kang & Waimey

(57) ABSTRACT

Disclosed is a mobile communication terminal with an integrated photographic apparatus having an optical zoom function. The terminal comprises of a body, a display, one or more input devices to enter terminal and photographic commands, and a photographic apparatus having a zoom function. The photographic apparatus comprises of a housing in which a lens, lens cap, and camera are situated. A rotation handle on the exterior surface of the camera can be used to manually manipulate the distance between the camera and the lens, thereby zooming in and out on a subject to be photographed. Alternatively, a motor and driving means can be installed to adjust the distance between the camera and the lens. A user can use the command functions of the terminal to input commands to the motor to effectuate zooming. Furthermore, a sensor installed in the terminal can be used for automated zooming.

4 Claims, 4 Drawing Sheets

[Type 1]

[Type 2]

[Type 3]

[Type 4]

[Type 5]

MOBILE COMMUNICATION TERMINAL WITH INTEGRATED PHOTOGRAPHIC APPARATUS AND METHOD FOR OPERATING THE SAME

CROSS REFERENCE TO RELATED APPLICATIONS

Pursuant to 35 U.S.C. § 119(a), this application claims the benefit of earlier filing date and right of priority to the Korean Patent Application No. 2002-44328, filed on Jul. 26, 2002, the content of which is hereby incorporated by reference in its entirety.

BACKGROUND OF THE INVENTION

1. Field of the Invention

The present invention relates to a mobile communication terminal with an integrated photographic apparatus, and more particularly, to a mobile communication terminal with an integrated photographic apparatus having a zoom lens.

2. Description of the Background Art

In general, mobile communication terminals include cellular phones or Personal Communication Systems (PCS) having wireless communication capabilities. As the need for video/image communication emerges along with voice communication, several types of mobile communication terminals with an integrated photographic apparatus have been suggested to satisfy this demand.

Referring to FIG. 1, various types of conventional mobile terminals are shown with cameras mounted on the terminals. In using such terminals, a user photographs a desired subject through manipulation of the functions of the mobile terminal and stores the photograph in the internal memory of the terminal or transmits the image to other storage means.

Should the user desire images with greater resolution or enlarged images of an object to be photographed, the user must physically approach the object, digitally zoom in prior to photographing, or enlarge the image subsequently via imaging software or programs. FIG. 2 illustrates a subject digitally zoomed in accordance with the conventional art.

Digital zoom of a subject is obtained by applying four pixels to every one pixel of the original image. Accordingly, if an image originally has a low number of pixels, then the image resolution after digital zoom is inferior. This impediment is compounded since the resolution of most cameras mounted on mobile communication terminals is already relatively low in comparison to hand-held digital cameras and other digital photographic apparatuses.

SUMMARY OF THE INVENTION

Accordingly, the present invention is directed to a mobile communication terminal with an integrated photographic apparatus that substantially obviates one or more problems due to limitations and disadvantages of the related art above.

An object of the present invention is to provide a mobile communication terminal with an integrated photographic apparatus having an optical zooming function.

Another object of the present invention is to provide a mobile communication terminal with an integrated photographic apparatus having an automatic zooming function.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a mobile communication terminal with an integrated photographic apparatus having means for optical zoom. The terminal comprises a body, a plurality of terminal manipulation devices, a display for reproducing an image created by the photographic apparatus, and this photographic apparatus. The photographic apparatus comprises a cylindrically shaped housing, a cylindrically shaped camera, a ring-shaped lens cap having an internal diameter sufficiently large so that a transmission of an image from the lens to the camera is not affected, and a zoom lens situated adjacent to the anterior opening of the housing. The housing comprises an anterior opening having diameter less than the diameter of a lens, a posterior opening having a diameter sufficient for receiving the lens, the lens cap, and the camera, and an inner surface. The camera has an anterior surface, on which a lens hole is formed, and a circular exterior surface. Finally, the lens cap comprises a plurality of notches to operationally engage with the inner surface of the housing.

According to one aspect of the present invention, the mobile communication terminal further comprises a cylindrically shaped handle that is in operative relationship to the housing such that rotation of the handle results in rotation of the housing. There is provided a first screw thread formed on the circular exterior surface of the camera. Additionally, a second screw thread is formed on the inner surface of housing, wherein the second screw thread is engaged to the first thread so that rotation of the housing results in rotation of the camera, thereby moving the camera longitudinally within the housing.

According to another aspect of the present invention, the mobile communication terminal further comprises a controlling unit, a motor, a drive shaft having an anterior and posterior ends, a pinion connected to the anterior end of the drive shaft, a rack affixed the to the housing and in operative relationship with the pinion, a plurality of longitudinal protrusions formed on the inner surface of the housing, and a plurality of grooves formed on the exterior surface of the camera. The posterior end of the drive shaft is operatively connected to the motor so that the motor rotates the drive shaft, in turn rotating the pinion. The plurality of longitudinal protrusions formed on the inner surface of the housing engage the plurality of grooves formed on exterior surface of the camera, resulting in longitudinal movement of the housing.

According to another aspect of the present invention, a sensor may also be installed in the terminal to automatically determine the zoom required to optimally photograph a subject.

BRIEF DESCRIPTION OF THE DRAWINGS

It is to be understood that both the foregoing general description and the following detailed description are exemplary and explanatory and are intended to further describe the invention as claimed.

The accompanying drawings, which are included to provide a further understanding of the invention and are incorporated in and constitute a part of this specification, illustrate embodiments of the invention and, together with the description, serve to explain the principles of the invention.

In the drawings:

FIG. 1 illustrates various types of mobile communication terminals having a camera mounted thereon according to the conventional art;

FIG. 2 illustrates a subject digitally zoomed according to the conventional art;

FIG. 3 illustrates a perspective view of a mobile communication terminal with an integrated photographic apparatus according to the present invention;

FIG. 4 illustrates an exploded perspective view of the integrated photographic apparatus according to the present invention;

FIG. 5 illustrates an exploded perspective view of the integrated photographic apparatus according to an alternative embodiment of the present invention;

FIG. 6 illustrates a block diagram of the operation of the mobile communication terminal with an integrated photographic apparatus according to one embodiment of the present invention; and FIG. 7 illustrates a block diagram of the operation of the mobile communication terminal with an integrated photographic apparatus according to another embodiment of the present invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to one or more embodiments of the invention, examples of which are illustrated in the accompanying drawings.

Figure 1:
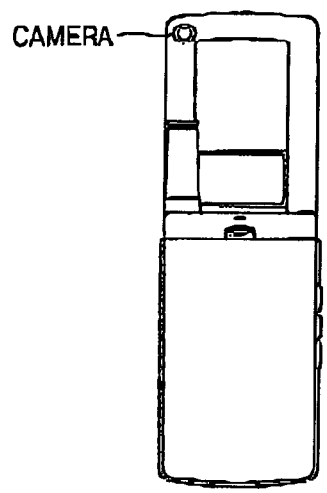
Figure 1:
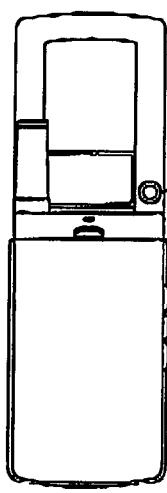
Figure 1:
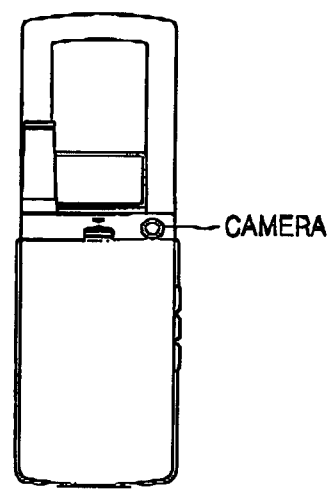
Figure 1:
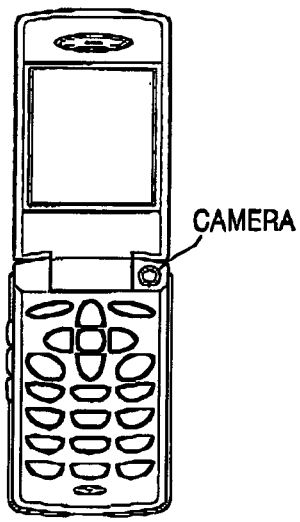
Figure 1:
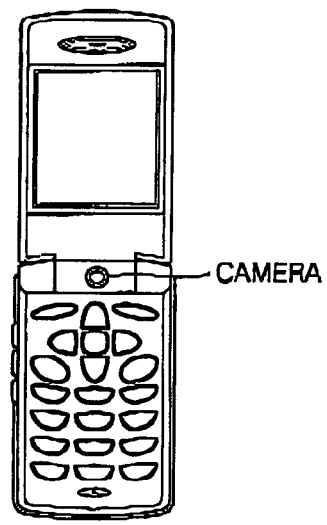
Figure 2:
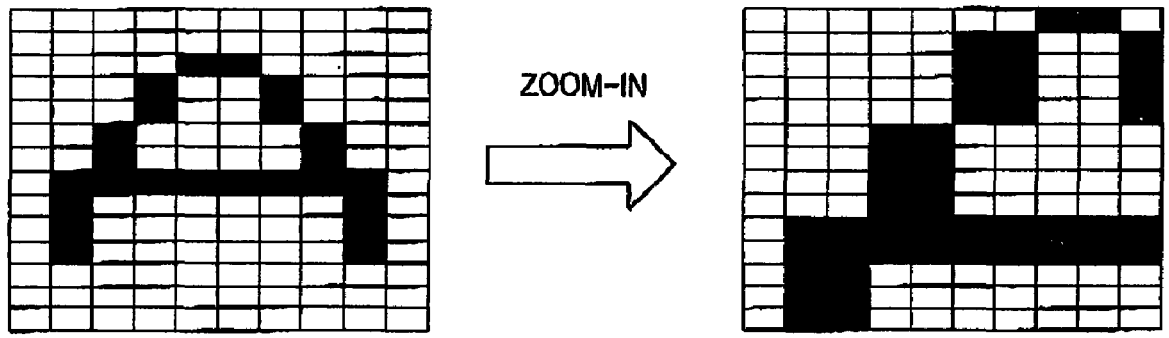
Figure 3:
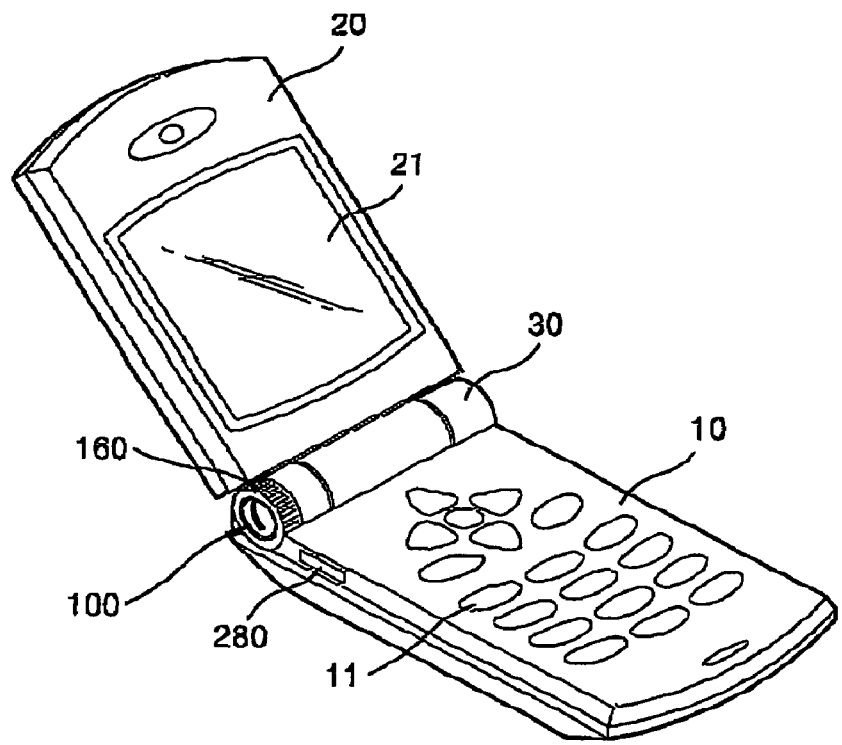

In FIG. 3, a mobile communication terminal in accordance with the present invention is illustrated as, for example, a folding type terminal. The terminal comprises a lower body 10 in which a plurality of terminal manipulation devices 11, such as a set of keypads, is mounted on the upper surface of the lower body 10. Alternatively, one or more terminal manipulation devices 11 may also be located on lateral surfaces of the upper body 20 or the lower body 10. The upper body 20 is shown to have a display 21, such as a liquid crystal display, on the lower surface of the upper body. A photographic apparatus 100 is installed on one side of the hinge 30, which rotatively connects the upper body 20 to the lower body 10, so that the photographic apparatus laterally faces outward from one side of the terminal. Also, a rotation handle 160 is located on the hinge 30 to manually manipulate the zoom function of the photographic apparatus in accordance with an embodiment of the present invention. A sensor 280 is located on exterior surface of the mobile terminal for automated zooming, in accordance with another embodiment of the present invention. In an exemplary embodiment, the sensor 280 is located on a lateral surface of the lower body, such that the sensor and the photographic apparatus receive the same image when in use.

Figure 4:
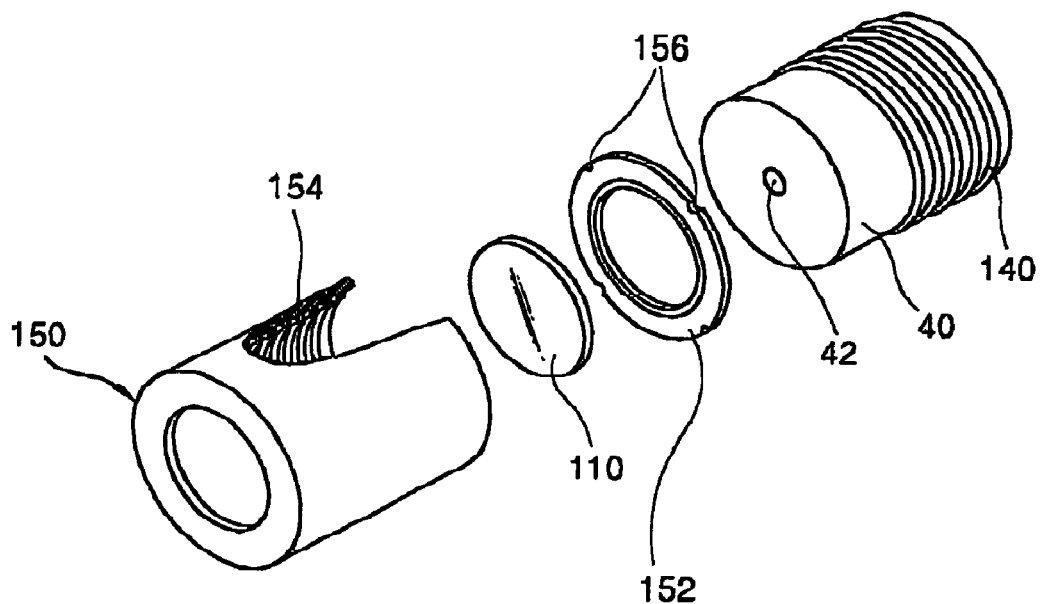

An embodiment of the photographic apparatus 100, as shown in FIG. 4, comprises a cylindrical housing 150, which houses a camera 40, a zoom lens 110, and a lens cap 152. The housing 150 has an anterior opening with a sufficiently small diameter to prevent the release of the lens 110 and has a posterior opening with a sufficiently large diameter to receive the lens 110, the lens cap 152, and the camera 40. The camera 40 has lens hole 42 located on the anterior surface of the camera 40. The lens cap 152 is ring shaped, wherein the center hole has a sufficiently large diameter so as not to obstruct the deflection of the image from the lens 110 to the camera 40. The lens cap 152, which prevents horizontal movement of the lens 110, also comprises a plurality of notches 156 that are in an operational relationship with the inner surface of the housing 150.

A first screw thread 140 is formed on the outer surface of the camera 40 and engages with the second screw thread 154 formed on the inner surface of the housing 150. Therefore, when a user rotates the rotation handle 160 (FIG. 3), the housing 150 is then rotated. The rotation of the housing 150 results in the rotation of the camera 40 due to the relationship between the first and second screw threads 140 and 154, respectively. Consequently, depending on the direction of rotation of the rotation handle 160, the user can manipulate the distance between the camera 40 and lens 110, thereby focusing the photographic apparatus 100 to zoom in on a subject to be photographed.

Figure 5:
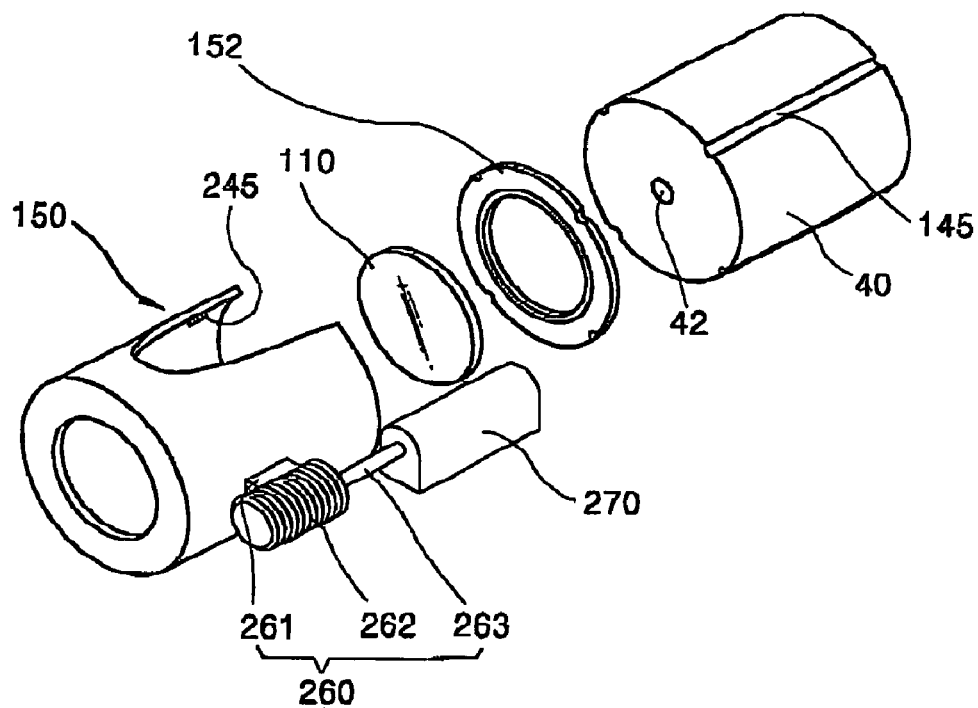

An alternative embodiment of the photographic apparatus 100 is illustrated in FIG. 5. Similar to the embodiment previously described, the photographic apparatus 100 in this embodiment comprises a cylindrical housing 150 which houses a camera 40, a zoom lens 110, and a lens cap 152. The housing 150 has an anterior opening with a sufficiently small diameter to prevent the release of the lens 110 and has a posterior opening with a sufficiently large diameter to receive the lens 110, the lens cap 152, and the camera 40. The camera 40 has lens hole 42 located on the anterior surface of the camera 40. The lens cap 152 is ring shaped, wherein the center hole has a sufficiently large diameter so as not to obstruct the deflection of the image from the lens 110 to the camera 40. The lens cap 152, which prevents horizontal movement of the lens 110, also comprises a plurality of notches 156 that are in an operational relationship with the inner surface of the housing 150.

A plurality of longitudinal grooves 145 is formed on the outer surface of the camera 40, which receive and engage with a plurality of longitudinal protrusions 245 formed on the inner surface of the housing 150. A motor 270 powers a driving mechanism 260 to longitudinally move the housing 150 in order to zoom the photographic apparatus 100. The driving mechanism 260 comprises a rack 261 that is attached to the exterior surface of the housing and has grooves that mesh with teeth of a pinion 262. The pinion 262 is rotated by a drive shaft 263 that is operatively connected to the motor 270. Consequently, manipulation and operation of the motor 270, as described in further detail below, results in the longitudinal movement of the housing 150 and lens 110, thereby affecting the distance between lens 110 and the camera 40. This results in zoom focusing of the photographic apparatus 100.

Figure 6:
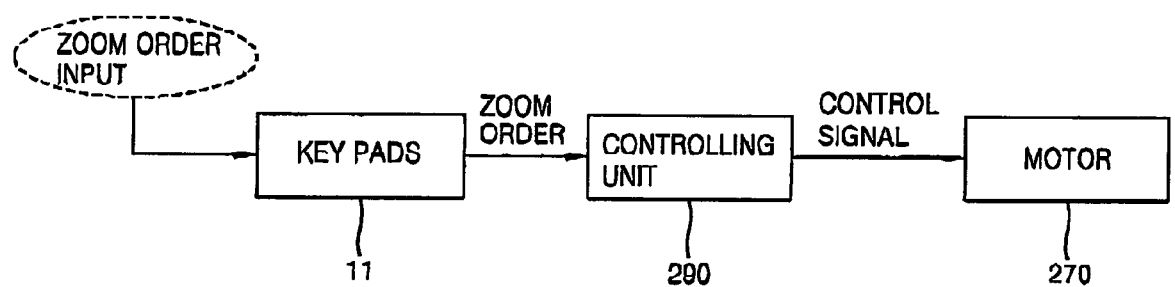

Zoom focusing of the photographic apparatus 100 in the embodiment shown in FIG. 5 is performed either through the use of one or more of the terminal manipulation devices 11 or automatically via the sensor 280. FIG. 6 illustrates a block diagram of the operation of the mobile communication terminal according to an embodiment of the present invention wherein zoom focusing is performed through the use of the terminal manipulation devices 11. A user, after viewing the image to be photographed on the display 21, enters a zoom order via engaging one or more of the terminal manipulation devices 11. A controlling unit 290 within the mobile terminal receives the input order and outputs a command to the motor 270 to either increase or decrease the distance between the lens 110 and the camera 40, i.e., to zoom in or to zoom out, respectively. The user may repeat entering zoom orders or, in the alternative, continue to engage the terminal manipulation device 11 for seamless operation until the desired image is produced on the display 21.

Figure 7:
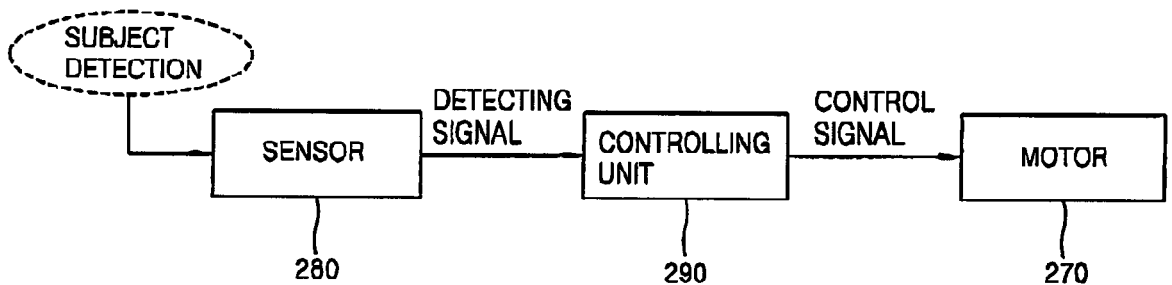

FIG. 7 illustrates a block diagram of the operation of the mobile communication terminal according to an embodiment of the present invention wherein zoom focusing is performed automatically through the use of the sensor 280. The sensor 280 detects a subject and measures the distance between the subject and the photographic apparatus 100. Once a subject is detected and the distance is measured, the sensor then sends a signal to the controlling unit 290. The controlling unit 290 in this embodiment compares the measured distance with a preset optimum distance. If the measured distance is greater than the preset optimum distance, then the controlling unit 290 outputs a command to the motor 270 so that the photographic apparatus 100 is optimally zoomed in the proper direction. Should the measured distance be less than the preset optimum distance, then the controlling unit 290 outputs a command to the motor 270 so that the photographic apparatus 100 is optimally zoomed in the reverse direction.

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents. Preferred embodiments were shown in the context of folding type mobile communication terminals. In alternative embodiments, candy bar and PDA type terminals can be substituted for the present invention.

What is claimed is:

1. An optical camera configured to be installed in a mobile device so that the optical camera faces outwardly from a lateral side of the device, the optical camera comprising:
    a cylindrically shaped housing comprising:
        an anterior opening having diameter less than the diameter of a lens;
        a posterior opening having a diameter sufficient for receiving the lens, a lens cap, and a camera; and
        an inner surface;
    a cylindrically shaped camera having an anterior surface, on which a lens hole is formed, and a circular exterior surface;
    a ring-shaped lens cap having an internal diameter sufficiently large so that a transmission of an image from the lens to the camera is not affected, the lens cap comprising a plurality of notches to operationally engage with the inner surface of the housing;
    a zoom lens situated adjacent to the anterior opening of the housing; and
    a means for optical zoom.

2. The camera of claim 1, wherein the means for optical zoom comprises:
    a screw head formed on the circular exterior surface of the cylindrically shaped camera;
    a screw thread formed on the inner surface of the housing to engage the screw thread formed on exterior surface of the camera, wherein rotation of the housing results in rotation of the camera, thereby moving the camera longitudinally within the housing; and
    a rotation handle in operative relationship with the housing such that rotation of the rotation handle results in rotation of the housing.

3. The camera of claim 1, wherein the means for optical zoom comprises:
    a plurality of longitudinal grooves formed on the circular exterior surface of the cylindrically shaped camera;
    a plurality of longitudinal protrusions formed on the inner surface of the housing to engage with the plurality of grooves formed on exterior surface of the camera;
    a controlling unit manipulated by at least one of a plurality of terminal manipulation devices;
    a motor operated by at least one signal transmitted from the controlling unit;
    a drive shaft having an anterior and posterior ends, wherein the posterior end is operatively connected to the motor so that the motor rotates the drive shaft;
    a pinion connected to the anterior end of the drive shaft; and
    a rack affixed to the housing and in operational relationship with the pinion so that rotation of the pinion results in longitudinal movement of the housing.

4. The camera of claim 1, wherein the means for optical zoom comprises:
    a plurality of longitudinal grooves formed on the circular exterior surface of the cylindrically shaped camera;
    a plurality of longitudinal protrusions formed on the inner surface of the housing to engage with the plurality of grooves formed on exterior surface of the camera;
    a sensor situated on the device and adjacent to the camera so that the sensor and the camera are congruent;
    a controlling unit manipulated by at least one signal received from the sensor;
    a motor operated by at least one signal transmitted from the controlling unit;
    a drive shaft having an anterior and posterior ends, wherein the posterior end is operatively connected to the motor so that the motor rotates the drive shaft;
    a pinion connected to the anterior end of the drive shaft; and
    a rack affixed to the housing and in operational relationship with the pinion so that rotation of the pinion results in longitudinal movement of the housing.

* * * * *